US006244850B1

(12) United States Patent
Van Benthum

(10) Patent No.: US 6,244,850 B1
(45) Date of Patent: Jun. 12, 2001

(54) PELLETIZING PRESS

(75) Inventor: Martinus Antonius Julius Van Benthum, Schijndel (NL)

(73) Assignee: Pelleting Technology Nederland v.o.f., Schijndel (NL)

( * ) Notice: Subject to any disclaimer, the term of this patent is extended or adjusted under 35 U.S.C. 154(b) by 0 days.

(21) Appl. No.: 09/284,568

(22) PCT Filed: Oct. 14, 1997

(86) PCT No.: PCT/NL97/00571

§ 371 Date: Apr. 16, 1999

§ 102(e) Date: Apr. 16, 1999

(87) PCT Pub. No.: WO98/17464

PCT Pub. Date: Apr. 30, 1998

(30) Foreign Application Priority Data

Oct. 18, 1996 (NL) .................................................. 1004319

(51) Int. Cl.[7] ............................ B30B 11/20; B29C 47/32

(52) U.S. Cl. .................... 425/331; 425/333; 425/382 R; 425/DIG. 230

(58) Field of Search ......................... 425/333, DIG. 230, 425/331, 332, 382 R

(56) References Cited

U.S. PATENT DOCUMENTS

| | | | | |
|---|---|---|---|---|
| 2,157,528 | | 5/1939 | Crabtree | 425/168 |
| 3,841,817 | * | 10/1974 | Moldenhauer et al. | 425/331 |
| 3,932,091 | * | 1/1976 | Vink | 425/331 |
| 3,981,664 | * | 9/1976 | Bittner et al. | 425/331 |
| 4,498,856 | * | 2/1985 | Botha et al. | 425/331 |
| 4,696,634 | * | 9/1987 | Zeller | 425/DIG. 230 |
| 4,770,621 | * | 9/1988 | Groebli et al. | 425/331 |
| 4,838,779 | * | 6/1989 | Vries | 425/DIG. 230 |
| 5,248,469 | * | 9/1993 | Wilhelm | 425/DIG. 230 |
| 5,251,545 | * | 10/1993 | Wetzel | 425/DIG. 230 |

FOREIGN PATENT DOCUMENTS

| | | |
|---|---|---|
| 38 16842 | 11/1989 | (DE) . |
| 0 238 147 | 9/1987 | (EP) . |
| 2 591 438 | 6/1987 | (FR) . |

* cited by examiner

*Primary Examiner*—Harold Pyon
*Assistant Examiner*—Thukhanh T. Nguyen
(74) *Attorney, Agent, or Firm*—Young & Thompson

(57) ABSTRACT

The invention relates to a pelletizing press (1) with a drum (2), comprising a drum axis (6) and at least one press roller (3) which is accommodated in the drum (2) in such a way that it can rotate about a press roller axis (8). The press roller is driven about the press roller axis by roller drive means (7, 27, 28, 29). The press roller (3) and/or the drum (2) are also rotated about the axis of the drum by rotation means. Furthermore, roller adjustment means (11, 12, 13, 16) are provided for varying the distance between the press roller and the drum wall. By designing the roller drive means, the rotation means and the adjustment means in the form of three concentrically situated shafts, an adaptation of the position of the press roller (3) can be obtained during continuous operation of the pelletizing press (1), in other words, during rotation of the press roller (3) about its axis and during rotation of the press roller (3) and/or the drum (2) about the drum axis (6). The concentrically arranged shafts form a relatively compact and simple drive for the pelletizing press according to the present invention.

10 Claims, 3 Drawing Sheets

PELLETIZING PRESS

The application relates to a pelletizing press, comprising a drum with a drum axis, at least one press roller which is accommodated in the drum in such a way that it can rotate about a press roller axis, roller drive means for rotation of the press roller about the press roller axis, rotation means for rotation of the press roller and/or the drum about the drum axis, and roller adjustment means for varying the distance between the press roller axis and the drum axis.

A pelletizing press of the abovementioned type is known from EP-A-0,489,046, which discloses a pelletizing press in which a kneadable compound can be extruded as pellets by rotation of one or more rollers over an internal surface of a drum provided with holes. In this case the rollers rotate about the axis of the drum, and the material placed in the drum, such as, for example, animal feed, is kneaded and forced through the apertures in the drum wall. In order to obtain the optimum roller setting, which depends on internal friction, humidity and the material which is being pelletized, the rollers are also driven so that they rotate about their axis. Moreover, the distance between the rollers and the inside wall of the drum can be varied, in order to vary the gap width between the internal surface of the drum and the roller, and it is possible to rotate the drum also about the drum axis.

EP-B-0,238,147, in the name of Applicant, discloses a pelletizing press in which the axes of the rollers can be moved relative to the drum axis by means of a cam mechanism. For this purpose, a shaft extends along the drum axis from outside the drum into the pelletizing space. The shaft for driving the roller about the drum axis is formed by a second, hollow shaft which extends around the adjustment shaft and is mounted on bearings thereon.

An object of the present invention is to provide a pelletizing press in which the distance between the press roller and the internal drum surface can be varied efficiently during operation. Another object of the invention is to provide a pelletizing press in which the press roller and/or the drum are driven about the axis of the drum, and in which the rotation of the press roller about the press roller axis is independent of the speed of rotation of the press roller about the drum axis.

For this purpose, the pelletizing press according to the present invention is characterized in that the roller adjustment means comprise a first shaft situated along the drum axis, the roller drive means comprising a second shaft, situated concentrically around or inside the first shaft, and the rotation means comprising a third shaft, situated concentrically around or inside the first shaft.

By designing the adjustment means of the press roller, the roller drive means and the rotation means in the form of three concentric shafts, it is possible to obtain a very compact construction with a relatively simple design. With the three concentric shafts, the gap width between the press roller and the drum wall can be varied during rotation of the press roller about the press roller axis and rotation of the drum and/or the press roller about the drum axis. This means that there can be continuous adjustment of the gap width to, for example, the viscosity of the material to be pelletized, which viscosity changes during the pelletizing process.

The quality of the end product is influenced by adjusting the gap width. For example, a harder pellet with a smaller fine fraction can be obtained with a small size of gap.

The shaft of the roller adjustment means preferably forms the central shaft. The said shaft can be operated in the essentially stationary state and need only be rotated to a slight extent for adjustment of the axis of the press roll. The second shaft of the roller drive means is mounted on bearings on the shaft of the roller adjustment means, on which shaft in turn the third shaft of the rotation means for driving the drum and/or the press roller about the drum axis is placed.

The roller adjustment means preferably comprise a cam plate which acts upon a bearing housing of the press roller, which bearing housing acts by way of a spring element upon a supporting frame, the bearing housing being movable relative to the drum axis by rotation of the cam plate in the radial direction along the supporting frame.

By means of a resilient support of the press roller bearings, the distance from the axis of the roller can be varied relative to the drum axis using simple cam plates.

The shaft of the press roller is preferably connected to a first gear wheel, while the second shaft of the roller drive means comprises a second gear wheel. The gear wheels are situated at virtually the same position along the drum axis and are interconnected by a coupling with a length which is variable in the radial direction. Such a coupling can be formed by, for example, an elastic belt or toothed belt.

An embodiment of a pelletizing press according to the present invention will be described in greater detail with reference to the appended drawing. In the drawing:

BRIEF DESCRIPTION OF THE DRAWINGS

FIG. 1 shows a pelletizing press 1 with a drum 2 which is set up in a stationary manner. Materials, such as fibrous material, powdered material and the like can be introduced into the drum 2 from the left-hand side in the figure, which material, wetted if necessary, can be kneaded in the drum 2 and extruded through apertures 5, 5' in the drum wall 4. For this purpose, a press roller 3 is accommodated in the interior of the drum 2, which press roller 3, rests with its periphery against the inside of the drum wall 4 or at a predetermined distance therefrom. The roller 3 is rotated by way of a shaft 9 about the axis 6 of the drum 2. By way of the material situated between the roller 3 and the drum wall 4, the roller is rotated with a certain degree of slip about the press roller axis 8 during rotation of the press roller 3 about the axis 6.

Figure 1:
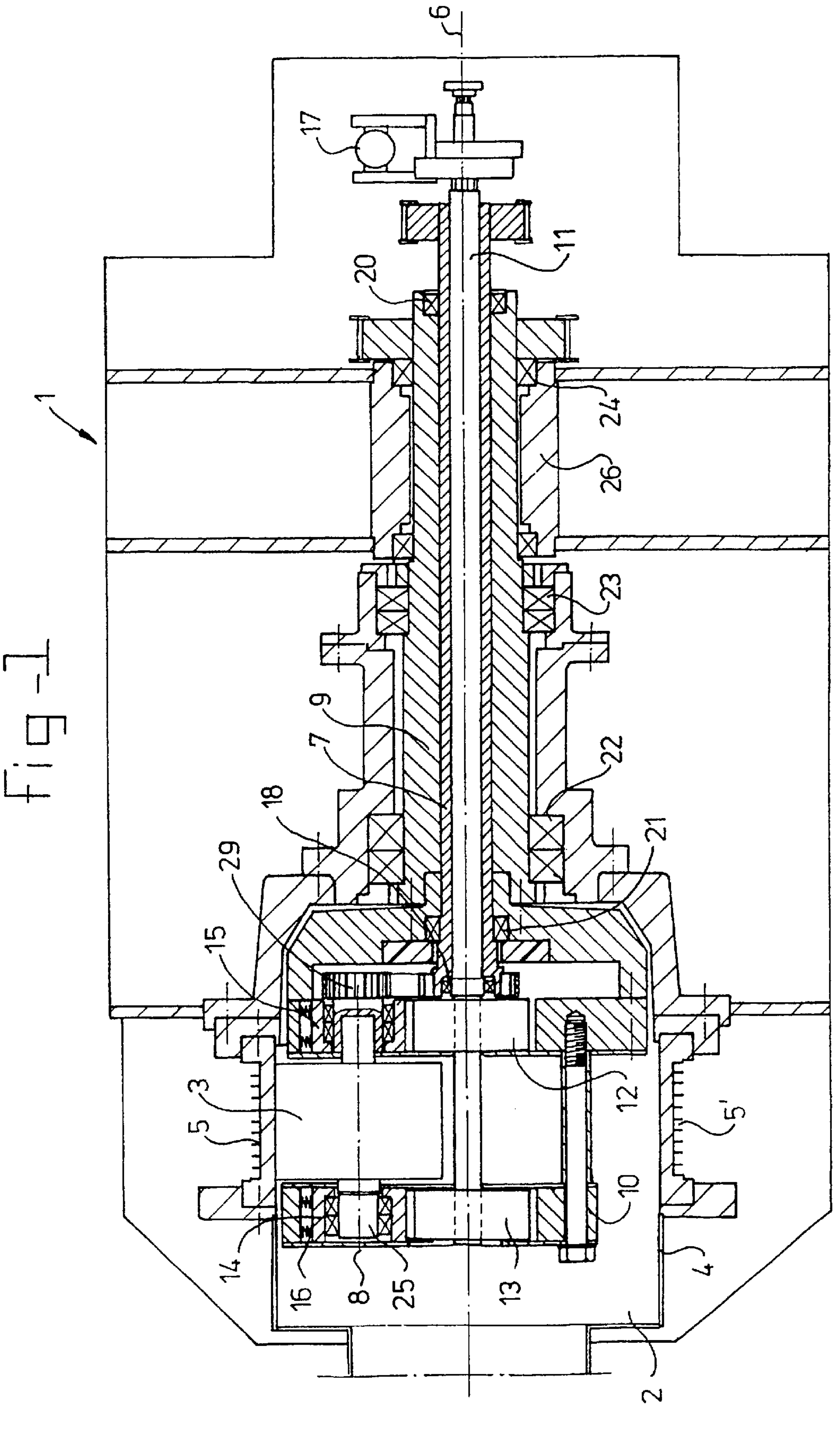
FIG. 1 shows a lateral section of a pelletizing press according to the present invention.

The press roller 3 is driven about the press roller axis 8 by means of roller drive means in the form of a shaft 7, so that the speed of rotation thereof is optimized relative to the material to be extruded, the speed of rotation about the axis 6 and the degree of slip between the roller 3 and the drum wall 4 during free rotation of the roller.

The press roller 3 is suspended with a bearing housing 14 and 15 in a supporting frame 10. The supporting frame 10 is rotated about the axis 6 by means of rotation means in the form of the shaft 9.

The pelletizing press 1 also comprises roller adjustment means, which in the embodiment according to FIG. 1 comprise the central shaft 11. Two cam plates 12, 13 are fixed on the shaft 11. The cam plates 12, 13 act upon the bearing housings 14, 15 of the press roller 3. The bearing housings 14, 15 are supported by way of spring elements 16 against the supporting frame 10. By rotation of the shaft 11 through a small angle, the cam plates 12, 13 slide along the bearing housings 14, 15, so that the position of the press roller axis 8 relative to the drum axis 6 is varied. This causes the press roller to be moved away from and towards the internal surface of the drum wall 4, and the position of the press roller can be adjusted during operation of the pelletizing press, in other words, during rotation of the press roller 3 about the press roller axis 8 and rotation of the press roller 3 about the drum axis 6. The rotation of the shaft 11 through a small angle can be obtained by, for example, a hydraulic cylinder 17.

The shaft 7 of the roller drive means is mounted on the inner shaft 11 by way of bearings 18. Around the shaft 7 the hollow shaft 9 of the rotation means is mounted by way of internal bearings 20, 21 and external bearings 22, 23 and 24, which are supported against a housing 26.

Figure 2:
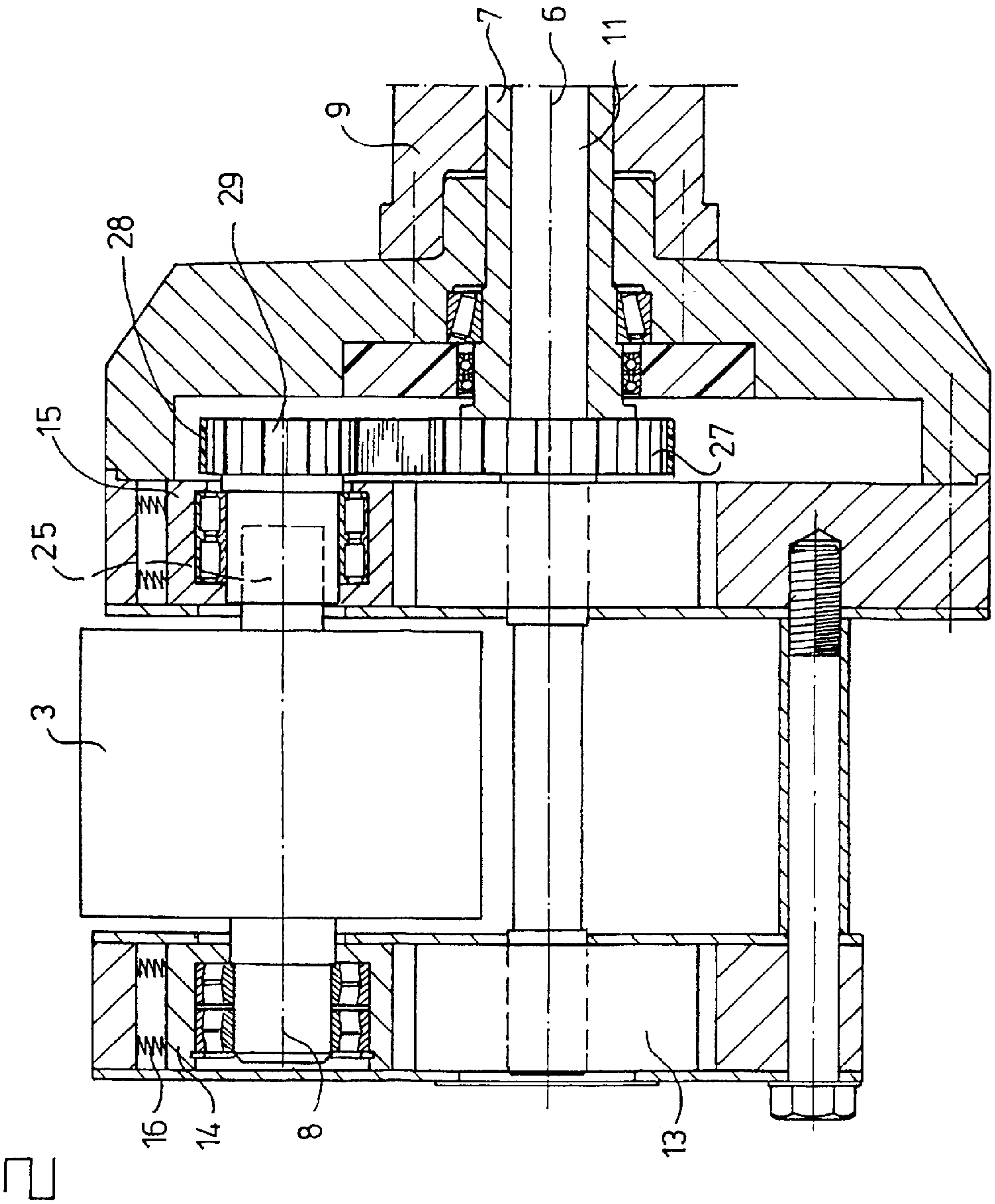
FIG. 2 shows an enlarged view of the press roller, the rotation means, the roller drive means and the roller adjustment means of the pelletizing press of FIG. 1.

As shown in FIG. 2, the drive shaft 7 comprises a gear wheel 27 near its end. The shaft 25 of the press roller 3 is likewise provided with a gear wheel 29 which is situated in a similar position along the drum axis 6. The gear wheels 27 and 29 are interconnected by a flexible toothed belt 28. This means that the position of the press roller 3 can be varied relative to the drum axis 6, while press roller 3 is rotated continuously.

Figure 3:
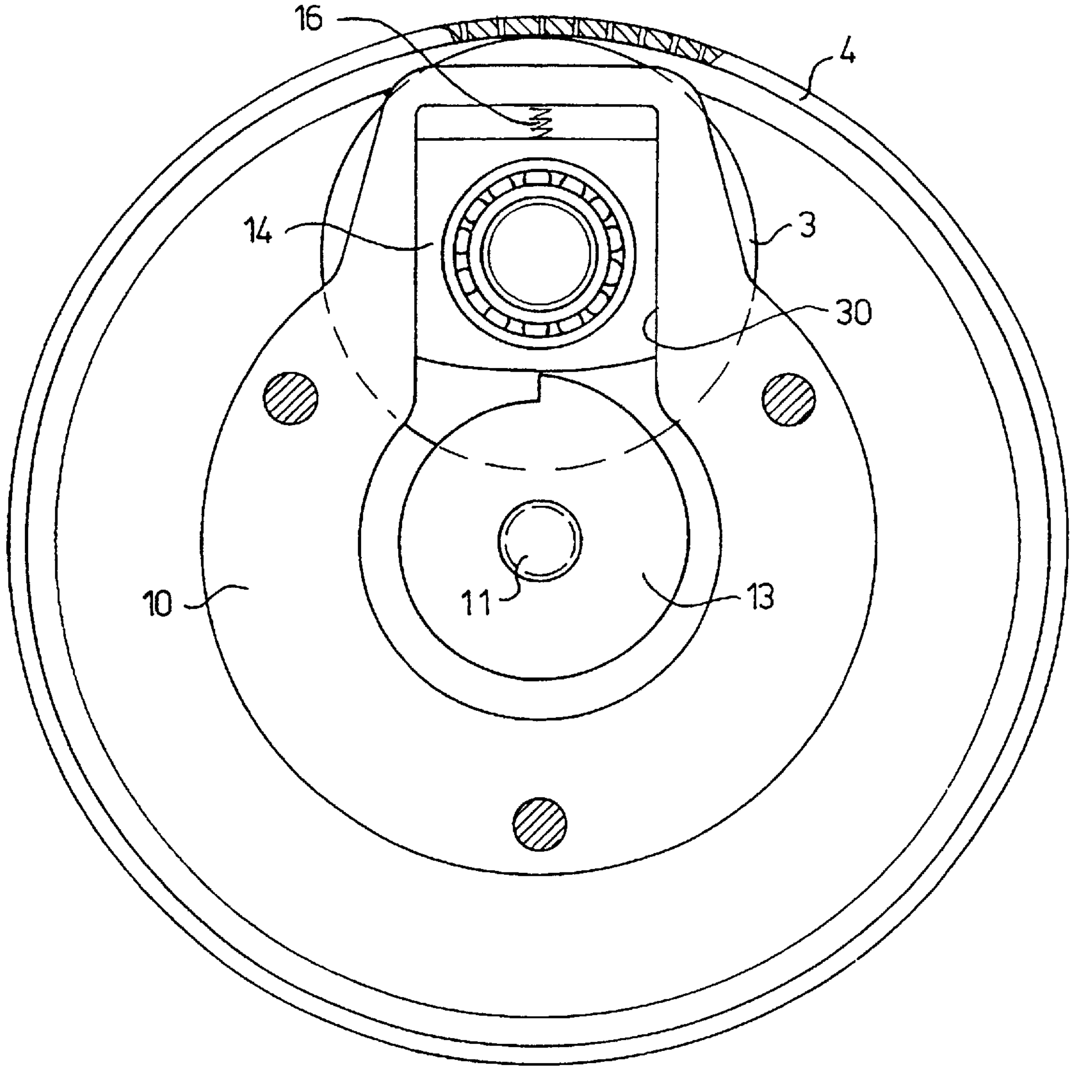
FIG. 3 shows a front view of the roller adjustment means according to the present invention.

As shown in FIG. 3, the supporting frame 10 comprises a groove 30 in which the bearing housing 14 of the press roller 3 is accommodated so that it slides in the radial direction. The cam plate 13 comprises an outer periphery which varies in diameter and rests against the bearing housing 14 and can move the latter against the spring force of the spring element 16 along the supporting frame 10. The gap between the roller 3 and the drum wall 4 can be varied by rotation of the roller adjustment shaft 11.

Although the invention has been described with reference to a concentric positioning of the roller adjustment shaft 11, the roller drive shaft 7 and the rotation shaft 9, the roller adjustment shaft forming the inner shaft and the rotation shaft forming the outer shaft, a construction in which the rotation shaft forms the inner shaft and the roller adjustment shaft forms the outer shaft can also be provided, although this is not the preferred construction.

Furthermore, instead of rotation of the press roller 3 about the drum axis 6 when there is a stationary drum wall 4, provision can be made for a rotating drum wall 4 with a stationary press roller 3, or in addition to driving of the press roller 3 about the axis 6, the drum wall 4 can also be driven about the said axis.

What is claimed is:

1. Pelletizing press (1), comprising:

a drum (2) with a drum axis (6), at least one press roller (3) which is accommodated in the drum (2) in such a way that it can rotate about a press roller axis (8), roller drive means (7, 27, 28, 29) for rotation of the press roller (3) about the press roller axis (8), rotation means (9) for rotation of at least one of the press roller and the drum about the drum axis, and roller adjustment means (11, 12, 13, 16) for varying the distance between the press roller axis (8) and the drum axis (6), characterized in that the roller adjustment means comprise a first shaft (11) situated along the drum axis, the roller drive means comprising a second shaft (7), situated concentrically around or inside the first shaft (11), while the rotation means comprise a third shaft (9), situated concentrically around or inside the first shaft (11).

2. Pelletizing press according to claim 1, in which the second shaft (7) is situated around the first shaft (11), and the third shaft (9) is situated around the second shaft (7).

3. Pelletizing press according to claim 1, characterized in that the rotation means (9) act upon the press roller (3) in order to rotate the latter about the drum axis (6).

4. Pelletizing press according to claim 1, characterized in that the roller adjustment means (11, 12, 13, 16) comprise a cam plate (12, 13) which acts upon a bearing housing (14, 15) of the press roller (3), which bearing housing (14, 15) acts by way of a spring element (16) upon a supporting frame (10), the bearing housing (14, 15) being movable relative to the drum axis (6) by rotation of the cam plate (12, 13) in the radial direction along the supporting frame (10).

5. Pelletizing press according to claim 1, characterized in that a press roller shaft (25) situated along the press roller axis (8) is connected to a first gear wheel (29), and the second shaft (7) is connected at its end to a second gear wheel (27) which is situated at virtually the same position along the drum axis (6) as the first gear wheel (29), the first and the second gear wheels being interconnected by a coupling (28) with a length which is variable in the radial direction.

6. Pelletizing press according to claim 1, characterized in that the second shaft (7) is mounted on bearings on the first shaft (11), and the third shaft (9) is mounted on bearings on the second shaft (7).

7. A pelletizing press, comprising:

a drum mounted to be rotatable about a drum axis;

at least one press roller mounted within the drum to be rotatable about a press roller axis laterally displaced from the drum axis;

a roller driver connected to the at least one press roller so as to cause rotation of the press roller about the press roller axis;

a drum driver connected to the drum so as to cause rotation of the drum about the drum axis; and an adjustment means for varying a distance between the press roller axis and the drum axis;

wherein the roller driver is operable independently of the drum driver.

8. The pelletizing press of claim 7, wherein the drum driver comprises a drum driver shaft, the roller driver comprises a roller driver shaft controllable independently of the drum driver shaft, and wherein the drum driver shaft and the roller driver shaft are concentric and centered about the drum axis.

9. The pelletizing press of claim 8, further comprising a toothed belt interconnecting the roller driver shaft and the at least one press roller so that rotation of the roller driver shaft causes rotation of the at least one press roller.

10. The pelletizing press of claim 9, wherein the toothed belt is flexible so that the distance between the press roller axis and the drum axis can be adjusted while the at least one press roller is continuously controllably rotated.

* * * * *